United States Patent [19]

Yoshida

[11] Patent Number: 5,022,699
[45] Date of Patent: Jun. 11, 1991

[54] COVERED ILLUMINATED VANITY MIRROR

[75] Inventor: Yoshihide Yoshida, Shimizu, Japan

[73] Assignee: Koito Manufacturing Co., Ltd., Tokyo, Japan

[21] Appl. No.: 417,637

[22] Filed: Oct. 5, 1989

[30] Foreign Application Priority Data

Oct. 7, 1988 [JP] Japan .................. 63-253440

[51] Int. Cl.⁵ .............................................. B60J 3/00
[52] U.S. Cl. ................................ 296/97.5; 362/74; 362/144
[58] Field of Search ................. 296/97.1, 97.5; 160/DIG. 3; 362/135, 137, 140, 141, 144, 74

[56] References Cited

U.S. PATENT DOCUMENTS

| | | | |
|---|---|---|---|
| 3,926,470 | 12/1975 | Marcus | 296/97.5 |
| 4,075,468 | 2/1978 | Marcus | 362/144 |
| 4,174,864 | 11/1979 | Viertel et al. | 296/97.5 |
| 4,213,169 | 7/1980 | Kempkers | 362/141 X |
| 4,227,242 | 10/1980 | Marcus | 362/140 X |
| 4,364,597 | 12/1982 | Viertel et al. | 296/97.5 |
| 4,586,788 | 5/1986 | Hansen | 296/97.5 X |
| 4,591,956 | 5/1986 | Majchrzak | 362/144 |
| 4,683,522 | 7/1987 | Viertel et al. | 362/135 |
| 4,760,503 | 7/1988 | VandenBerge et al. | 362/135 X |
| 4,764,852 | 8/1988 | Sakuma | 362/135 |
| 4,909,562 | 3/1990 | Sakuma et al. | 296/97.5 |

Primary Examiner—Dennis H. Pedder
Assistant Examiner—Andrew C. Pike
Attorney, Agent, or Firm—Koda & Androlia

[57] ABSTRACT

A covered illuminated vanity mirror including includes a mirror body, a mirror supported on the mirror body, and a cover for exposing and covering the front surface of the mirror and being pivotally mounted on the mirror body. A mounting lug is formed on the cover, and the mirror body is formed to define a space for receiving therein pivotally and movably the mounting lug of the cover. The mounting lug is further formed to have an end surface which is faced faces toward the a rear direction in the open exposed condition of the cover and another end surface which is faced toward the a rear direction in the closed covered condition of the cover. A spring member is received in a space in the mirror body and resiliently selectively engages with corresponding end surfaces of the mounting lug selectively.

5 Claims, 14 Drawing Sheets

COVERED ILLUMINATED VANITY MIRROR

FIELD OF THE INVENTION

This invention relates to a vanity mirror and, particularly, to a vanity mirror installed on a sun visor of a vehicle such as an automobile.

DESCRIPTION OF PRIOR ART

Various vanity mirrors have been proposed as shown e.g. U.S. Pat. Nos. 3,926,470, 4,227,242, 4,364,597, 4,586,788, 4,683,522 and 4,764,852. Such vanity mirrors are mounted on sun visors of a vehicle and, are usually provided with a lamp so that the vanity mirror can be used satisfactorily in an insufficiently illuminated or a dark circumstances. As a vanity mirror mounted on a sun visor of a vehicle, it is required to reduce the weight; to minimize the thickness thereof; to improve the operational reliability, such that a cover normally covering the mirror can easily be opened and closed and can reliably maintained at open and close conditions and that; to maintain the lamp can safely [be maintained at lit condition when the cover is opened; to reduce the cost for producing, assembling and adjusting the vanity mirror; and the like.

Figure 17:
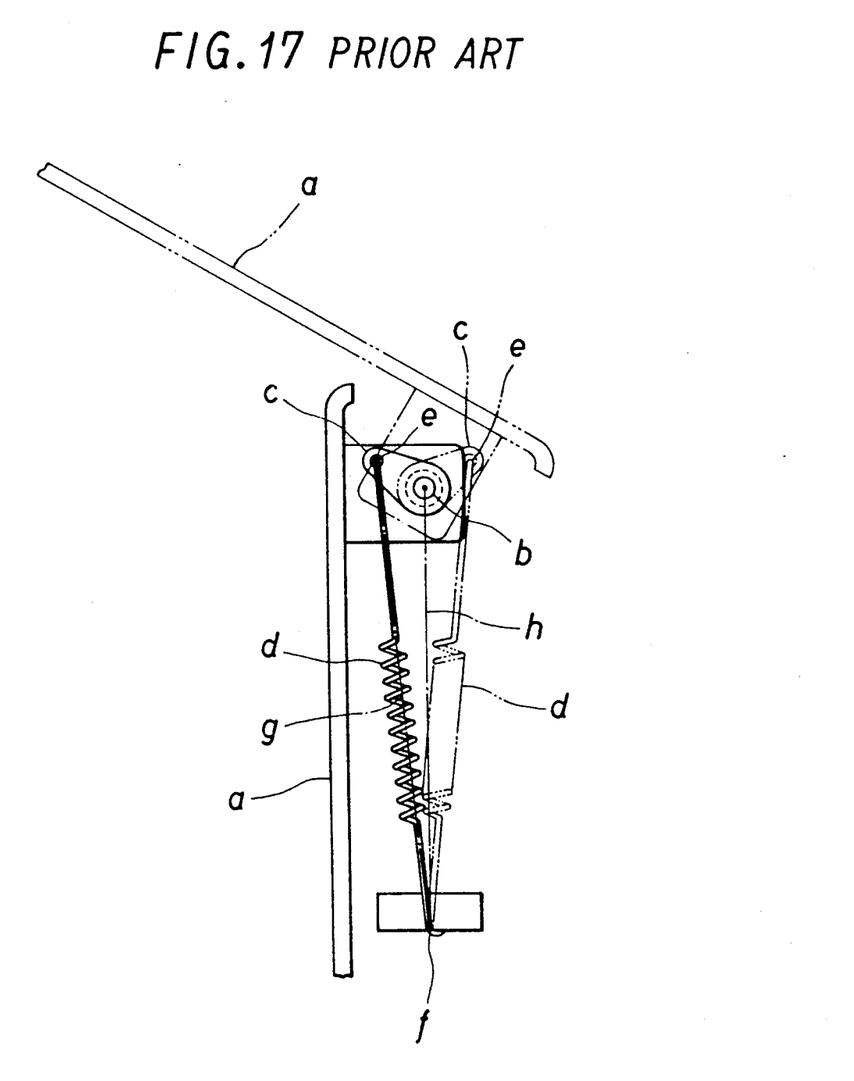
FIG. 17 is a schematic side view of a prior art vanity mirror.

One example of an opening and closing mechanism for the cover of a prior art vanity mirror is shown in FIG. 17. In the drawing, shown at a is the cover, at b is a shaft pivotally supporting the cover a, at c is an arm fixed to the cover a and being movable around the shaft b, at d is a tension coil spring, at e is a point connecting the spring d and the arm c, and at f is a point connecting the spring d and a body of the vanity mirror. When a line g connecting the two points e and f is at the right side of, as shown in chain lines in FIG. 17, a line h connecting the axis of the shaft b and the point f the cover a is rotated in the clockwise direction so as to maintain the cover a at the open condition, and when the line g is at the left side of the line h the cover a is rotated in the counterclockwise direction so as to maintain the cover a at the closed condition.

However, the mechanism shown in FIG. 17 has problems as follows. Firstly, since the coil spring d and the arm c are moved between the positions shown in solid and chain lines in FIG. 17, it is required to have a space which does not interfere with the displacement of the coil spring d and the arm c, thus, the thickness of the vanity mirror increases. Further, since the coil spring d moves between the opposite sides of the shaft b, the arm c and the coil spring d should be located outside of an end of the shaft b which increases the width of the vanity mirror. Further, it is very difficult to mount the coil spring d in a very limited space of a body of the vanity mirror in which the coil spring d should be connected with the two supporting points e and f at the elongated condition.

SUMMARY OF THE INVENTION

The present invention aims to provide a novel vanity mirror satisfying the aforesaid requirements.

According to the invention, a vanity mirror is provided which includes a cover for exposing and covering the front surface of the mirror, amounting lug formed on the cover and mounted pivotally on the mirror body, the mirror body is formed to define a space for receiving the pivotally movable mounting lug of the cover therein, the mounting lug is formed to have an end surface which faces toward a rear direction in the exposed condition of the cover and another end surface which faces toward a rear direction in the covered condition of the cover, and a resilient member received in the space in the mirror body and resiliently and selectively engaging with corresponding end surfaces of the mounting lug.

Thus, according to the present invention, the cover is maintained in exposed condition by the resilient member which engages with an end surface facing in the rear direction in the exposed condition and is maintained in the covered condition by the resilient member which engage with an end surface facing in the rear direction in the covered condition. The resilient member can be assembled very easily since after the cover is assembled with the mirror body, the resilient member is inserted into a space being formed in the mirror body and covering the rear portion of the mounting lug. Further, the retaining mechanism comprises the mounting lug of the cover, the space covering the rear portion of the lug, and the resilient member inserted into the space. Thus it is possible to reduce the size in the depth direction and to reduce the thickness of the vanity mirror. Since the resilient member is disposed on the rearside of the cover, the widthwise dimension of the mirror body does not increases excessively.

BRIEF DESCRIPTION OF THE DRAWINGS

Further objects and effects of the invention will become apparent from the following detailed description taken in conjunction with the drawings, in which.

DETAILED DESCRIPTION OF PREFERRED EMBODIMENTS

Shown at numeral 1 in the drawings is a sun visor assembly consisting of a sun visor 2 and a vanity mirror 3 assembled in the sun visor 2.

The sun visor 2 may be of any desired construction, for example, consisting of a core member being covered by a cushion member with the upper portion of the core member being rotatably mounted on the body of the vehicle and above the front windshield by a mounting shaft 4. A recess 5 is formed in the front surface of the sun visor 2 for receiving the vanity mirror 3.

The vanity mirror 3 comprises a mirror body 6, a mirror 29 supported on the mirror body 6, a cover 84 and a lamp portion.

Figure 5:
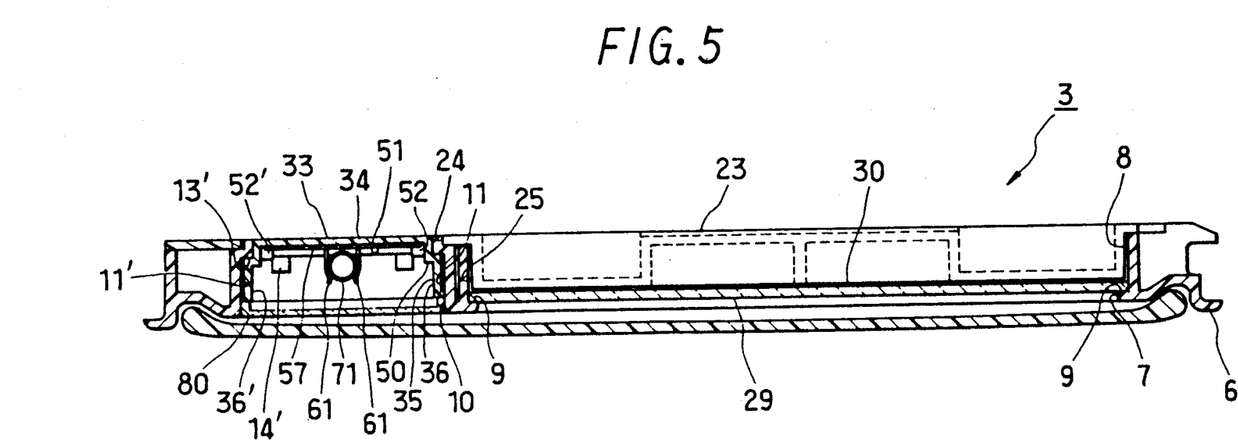
FIG. 5 is an enlarged sectional view taken along line V—V in FIG. 2.
Figure 6:
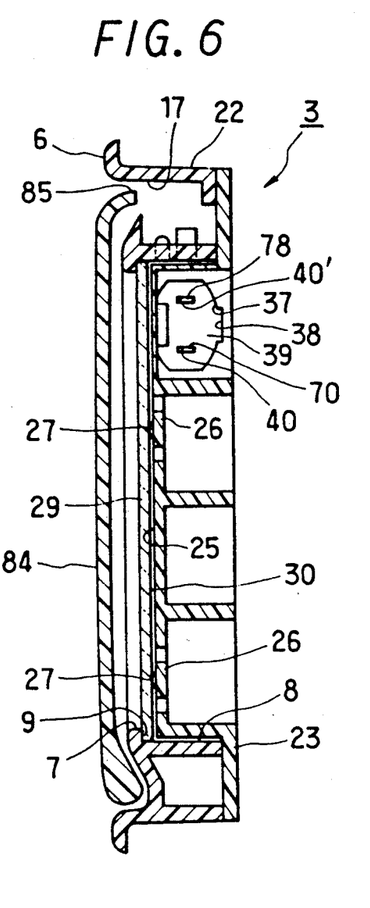
FIG. 6 is an enlarged sectional view taken along the line VI—VI in FIG. 2.
Figure 7:
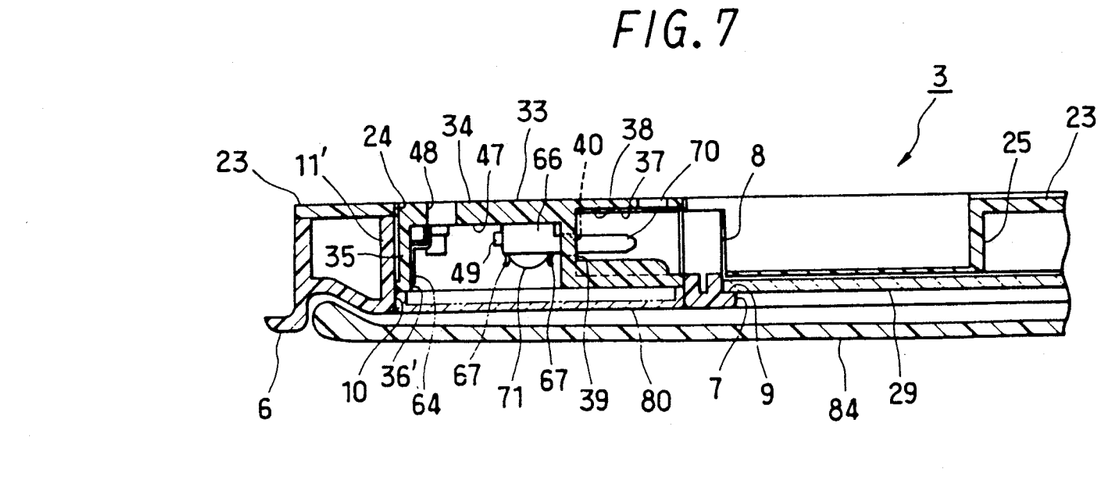
FIG. 7 is an enlarged sectional view taken along line VII—VII in FIG. 2.

The mirror body 6 is formed of a synthetic resin material and has a generally horizontally elongated rectangular shape in the front view. A relatively large horizontally elongated opening 7 is formed in the mirror body 2 and adjacent to the right side edge. A peripheral wall 8 extends rearward to define the opening 7 and a mounting step portion 9 as clearly shown in FIG. 5.

A relatively small and vertically extending opening 10 is formed near to the left side edge of the opening 7, and side walls 11 and 11' are formed to extend rearward and to define the left and right side edges of the opening 10. The amount of rearward extension or the depth of the side walls 11 and 11' is nearly equal to that of the wall 8. The lower rear end portions of the side walls 11 and 11' are connected through a connecting plate 12. On the opposing surfaces of the side walls 11 and 11' and in the rear central portions there are formed ridges 13 and 13' respectively.

Figure 9:
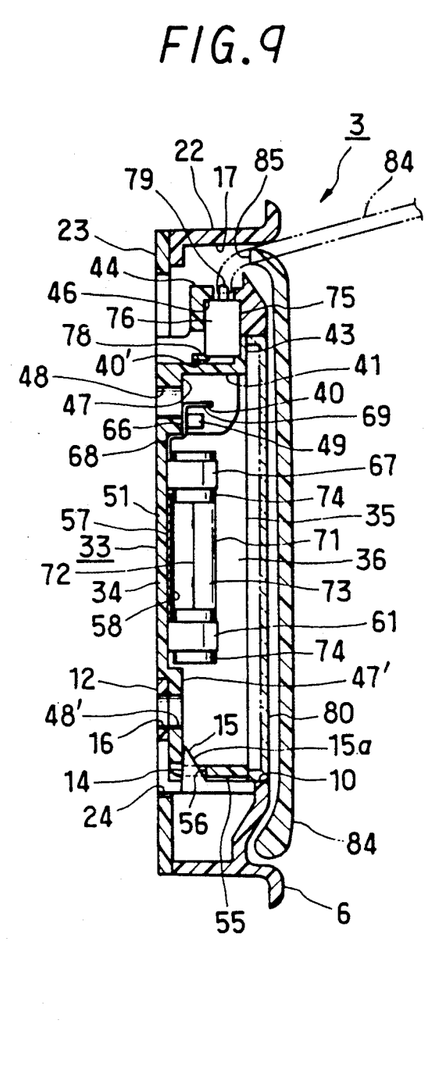
FIG. 9 is an enlarged sectional view taken along line IX—IX in FIG. 3.
Figure 10:
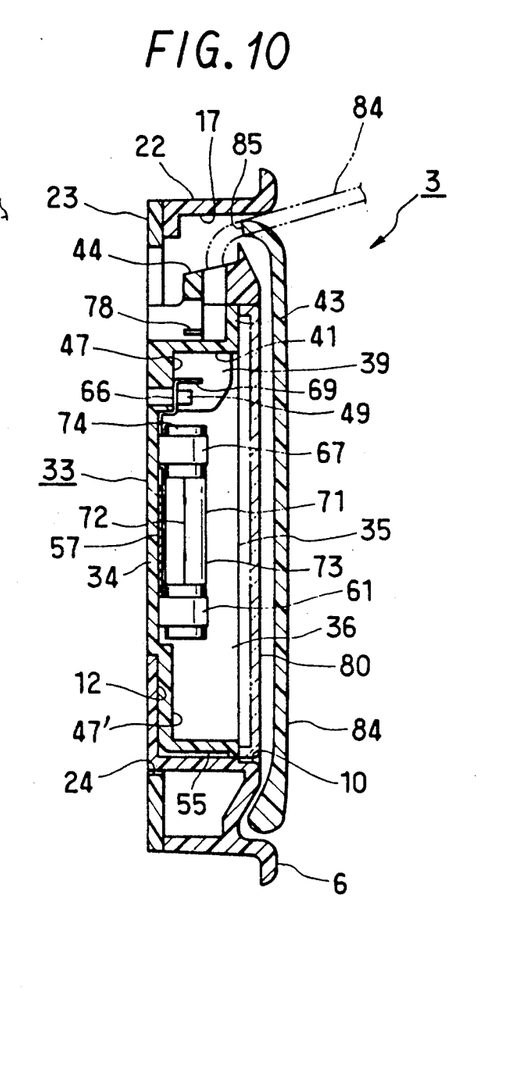
FIG. 10 is an enlarged sectional view taken along line X—X in FIG. 3.
Figure 11:
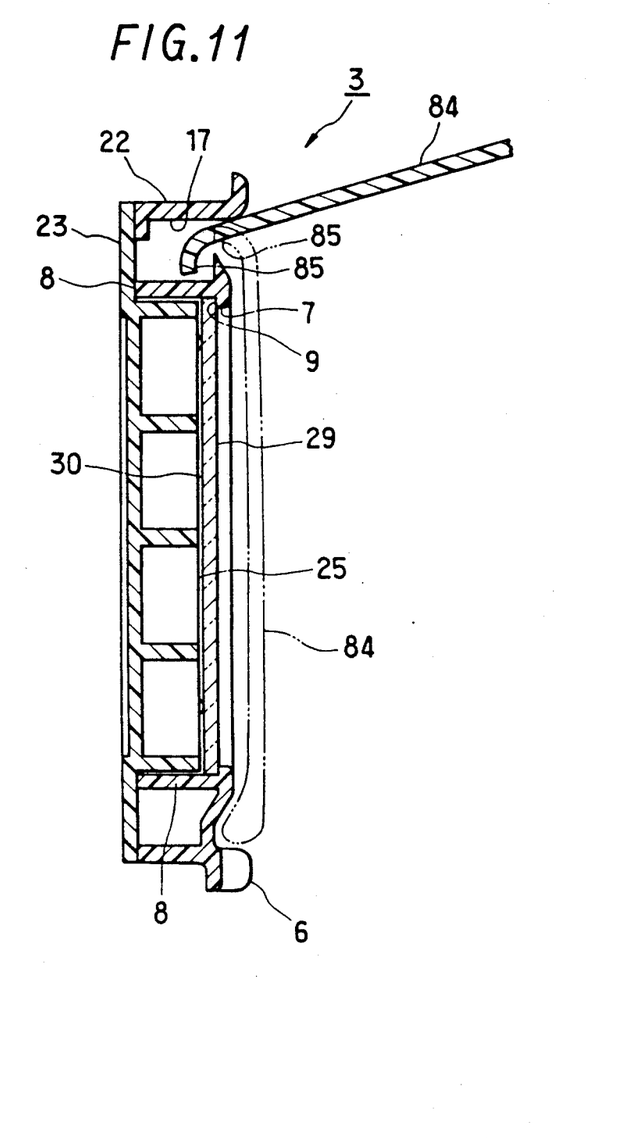
FIG. 11 is an enlarged sectional view taken along line XI—XI in FIG. 3.
Figure 12:
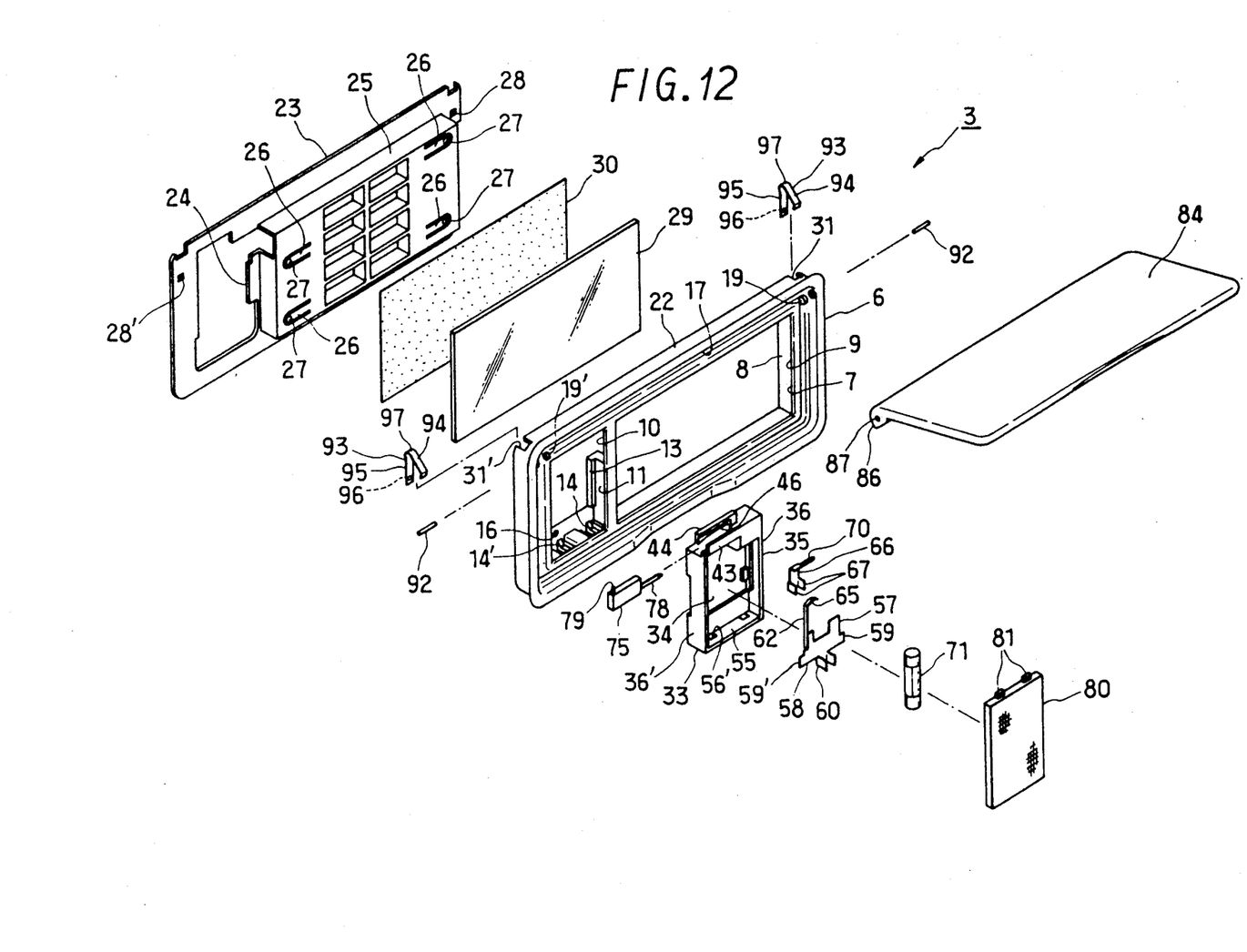
FIG. 12 is a perspective broken view of the vanity mirror of FIG. 1.
Figure 13:
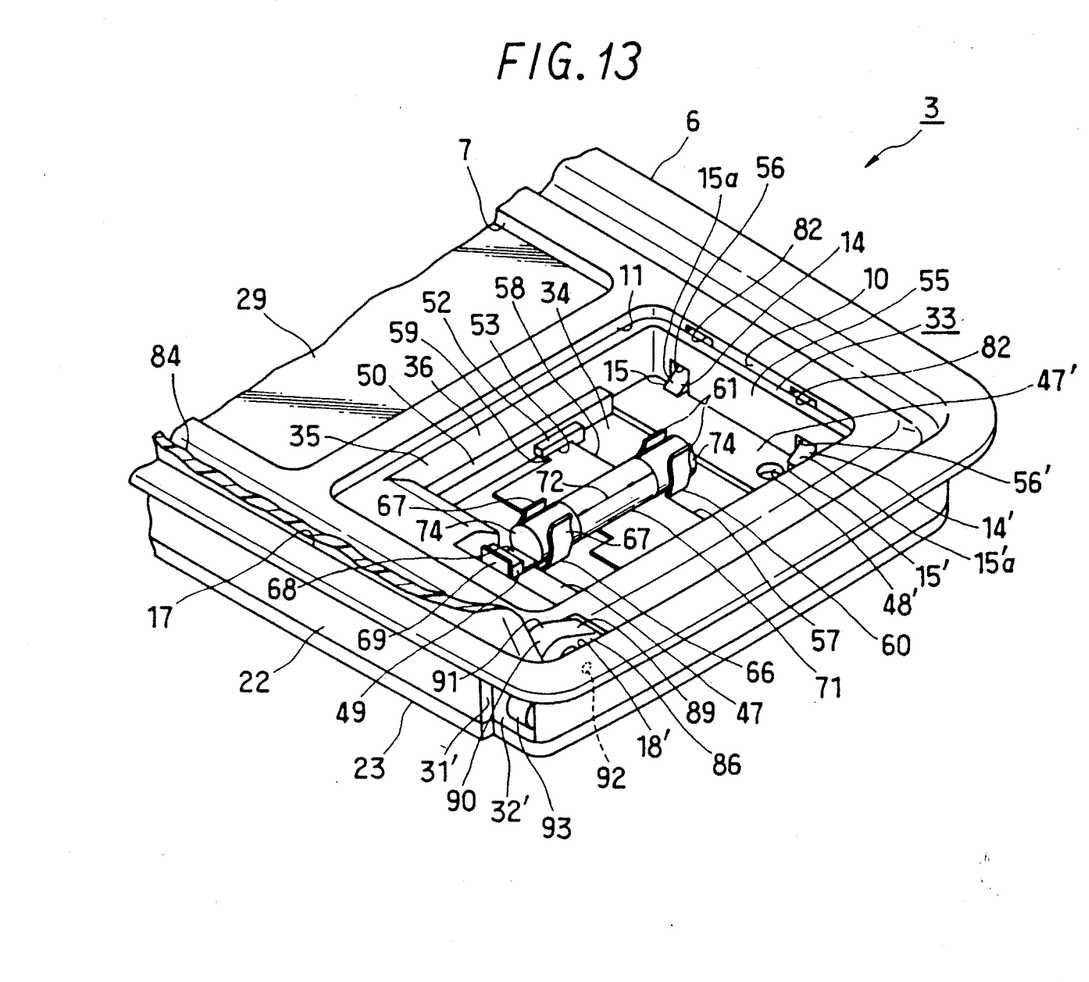
FIG. 13 is an enlarged perspective view of the vanity mirror of FIG. 1 with a lens being removed.
Figure 14:
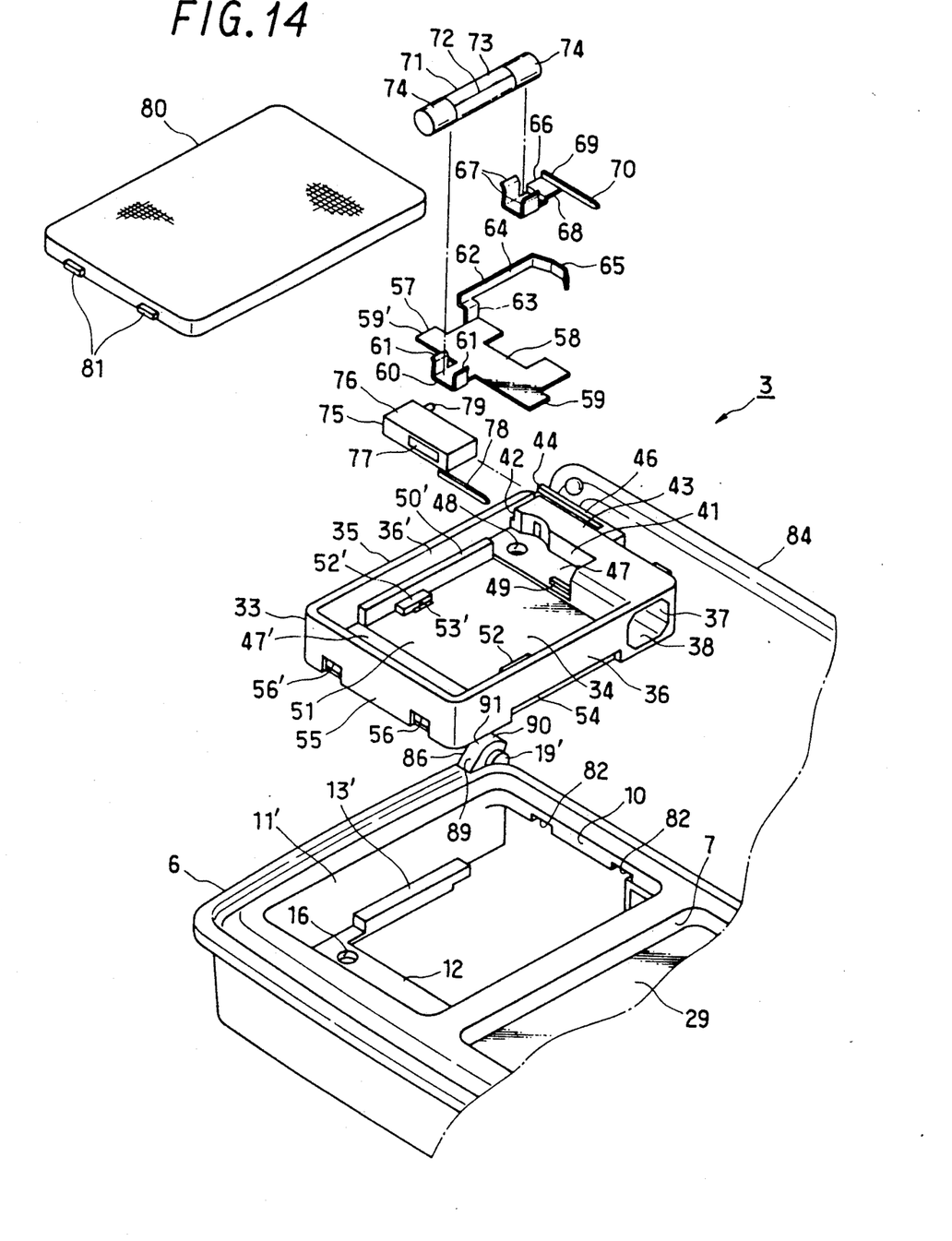
FIG. 14 is an enlarged broken perspective view of a lamp portion of the vanity mirror of FIG. 1.
Figure 15:
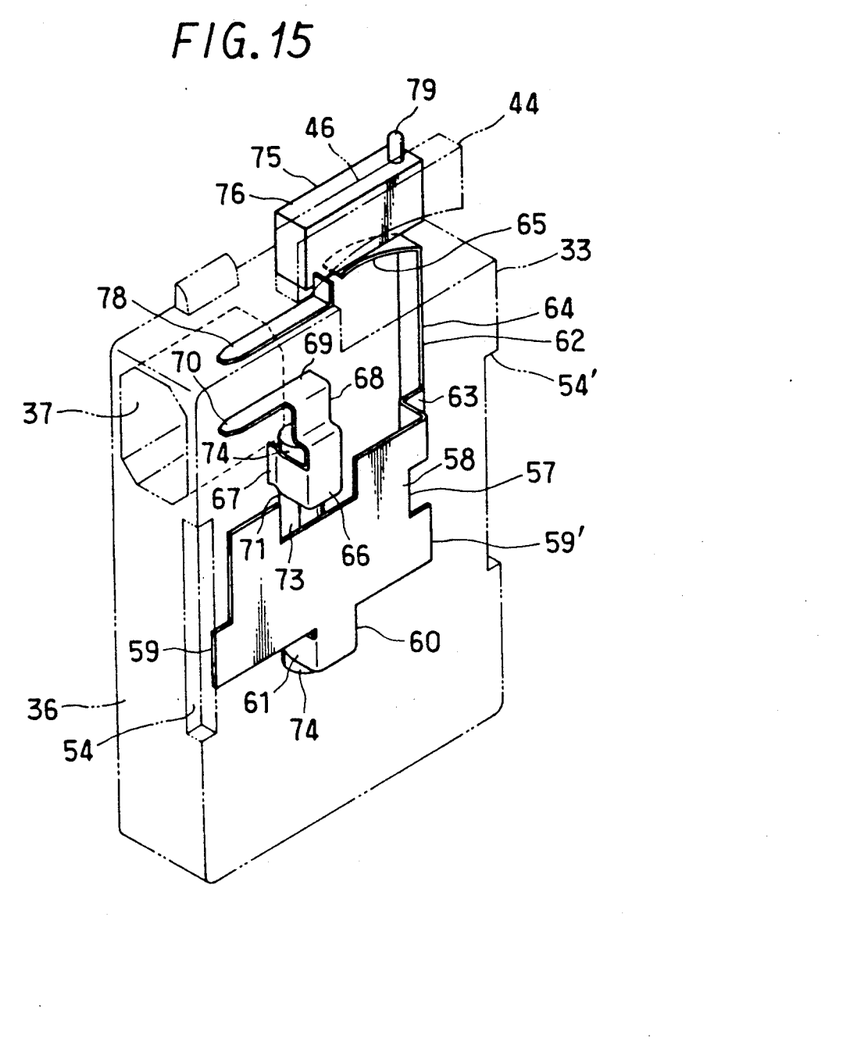
FIG. 15 is an enlarged perspective view of a part of the lamp portion of the vanity mirror of FIG. 1.
Figure 16:
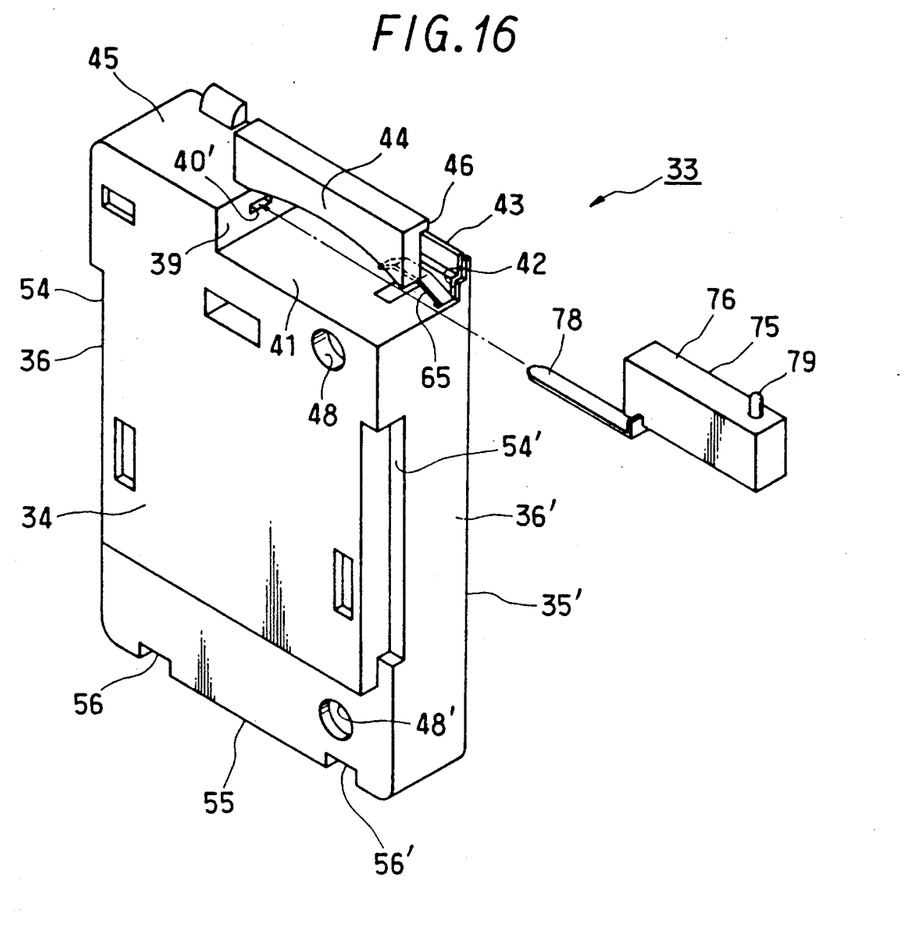
FIG. 16 is an enlarged perspective view of a part of the lamp portion of the vanity mirror of FIG. 1.

Retaining pawls 14 and 14' are formed on the lower edge of the opening 10 and near to the opposite sides thereof respectively. The rear ends of retaining pawls are located slightly forward of the side walls 11 and 11'. The pawls 14 and 14' have respectively pawl portions 15 and 15' with the front surfaces 15a and 15'a inclined upward and rearward as shown in FIG. 9. An opening 16 is formed in the connecting plate 12.

A slit 17 is formed in the mirror body 6 along the upper edge thereof, and side portions 18 and 18' are formed on the opposite sides of the slit 17 to extend slightly downward.

Mounting lugs 19 and 19' are formed respectively on the opposite ends of the slit 17 to project from the lower edges of the slit toward the forward and slightly upward direction, and have supporting holes 19a and 19'a which extend there through in the left and right directions respectively. Corresponding respectively to the supporting holes 19a and 19'a, there are formed supporting openings 20 and 20' in the outer side portions of the mirror body 6.

Generally L shaped wall members 21 and 21' are formed on the upper end portions of opposite sides of the mirror body 6, with the inner edges of the horizontal portions thereof being continuous to the outer side surfaces of the side wall 11' and the surrounding wall 8 respectively.

An upper side wall 22 is formed on the mirror body 6 to extend rearward from the upper edge of the mirror body, and cutout portions are formed in the opposite side edges thereof.

The wall members 21 and 21', the upper end portion of the side wall 11', the upper end portions of the side portions of the wall 8 and the left and right cutout portions in the upper side wall 22 cooperate to define a recessed portion which opens in the upper and the rear directions and the front side thereof opens in the forward direction through the side wall portions 18 and 18' of the slit 17.

The mirror body 6 is integrally formed of a synthetic resin material, preferably of a thermoplastic material.

A rear cover 23 covers the rear surface of the mirror body 6 and has an opening 24 corresponding to the opening 10 in location and configuration.

A pedestal portion 25 is integrally formed on the rear cover 23 to project forward, with the configuration being slightly smaller than the inner configuration of the peripheral wall 8.

Shown at numerals 28, 26 . . . are resilient members received respectively in U-shaped grooves formed in the front plate of the pedestal portion 25. Pressing lugs 27, 27 . . . are formed respectively on tip ends of the resilient members 28, 26 . . . respectively.

Retaining openings 28 and 28' are formed in the rear cover 23 at the location corresponding to the lower ends of portions surrounded by the L shaped wall members 21 and 21' of the mirror body 6.

The rear cover 23 is also formed of a synthetic resin material similar to that of the mirror body 6.

The mirror 29 has a horizontally extended rectangular configuration, and is inserted from the rear into a space defined by the surrounding wall 8. The front surface of the peripheral portion of the mirror 29 abuts with the mounting step 9 of the mirror body 6.

A shatter preventing tape 30 is bonded to the rear surface of the mirror 29.

The rear cover 23 is secured to the rear side of the mirror body 6 with the mirror 29 being mounted on the mirror body 6. The pedestal portion 25 of the rear cover 23 is inserted into the space defined by the surrounding wall 8 from the rear side. The rear cover 23 is secured to the rear end surface of the surrounding wall 8, the rear end surface of the wall members 21 and 21', the rear end surface of the upper side wall 22 and the like by fusion welding.

By securing the rear cover 23 to the mirror body 6 as described above, the front end of the pressing lugs 27, 27 . . . of the resilient members 26, 26 . . . resiliently abut with the rear surface of the mirror 29 through the scatter preventing tape 30, whereby the mirror 29 is reliably retained between the mirror body 6 and the rear cover 23.

On the left and right upper end portions of the mirror body 6, there are formed spaces 32 and 32' with the front end opening at the side portions 18 and 18' of the slit 17, and having openings 31 and 31' in the upper ends, and having retaining openings 28 and 28' in the rear lower end portions respectively.

The lamp portion comprises a lamp body 33 supported on the mirror body 6, lamp retaining members 57 and 66, an electric lamp 71, and a switch 75.

The lamp body 33 is preferably formed of a synthetic resin material with heat resistant temperature higher than that of the material of the mirror body 6 and the rear cover 23, such as a polycarbonate resin. Preferably, the lamp body 33 has a color with good reflective properties such as white and the like.

The lamp body 33 has a vertically extended rectangular configuration in the front view, and consists of a bottom plate portion 34 and a peripheral wall portion 35 extending from the circumference of the bottom plate portion 34.

A relatively deep socket recess 38 is formed in one of the side walls 36 of the peripheral wall portion 35 of the lamp body 33, and has an opening 37 adjacent to the upper end portion of the lamp body. Vertically aligning terminal inserting holes 40 and 40' are provided in the bottom wall 39 of the socket recess 38. An upper wall 41 is formed between the other of the side walls 36' and a portion of the bottom wall 39 of the socket recess 38 between the terminal inserting holes 40 and 40'. Thus, one of the terminal inserting holes 40 is located inside of the upper wall 41 and the other 40' is located outside of the upper wall 41.

A slit 42 is formed between the upper wall 41 and the other side wall 38'.

A flange 43 is formed on the front edge of the upper wall 41 projecting upward, and a lug 44 is formed on the intermediate portion of an upper wall 45 of the socket recess 38 to project toward the other side wall 36' and has a ridge 46 on the front surface of the upper edge of the lug 44.

The upper and lower end portions 47 and 47' of the bottom plate portion 34 are slightly thicker as compared with remaining portion, and have respectively insert holes 48 and 48'.

A projection 49 is formed on the bottom wall 39 of the socket recess 38 to project toward the side wall 36', and a narrow space is defined between the lower edge of the projecting portion 47.

Ridges 50 and 50' are formed on opposite side edges of the central portion 51 of the bottom plate portion 34, and the central portion 51 is recessed slightly in the rear direction. On the opposing surfaces of the ridges 50 and 50' there are formed generally L shaped projecting portions 52 and 52' so as to define retaining grooves 53 and 53' between the bottom plate portion 34, and the grooves open in the upward direction.

In the rear end portions of the outer surfaces of the side walls 36 and 36' there are formed grooves 54 and 54' at the location corresponding to the inner ridges 50 and 50' respectively.

Retaining openings 58 and 58' are formed in the rear end portions of the lower wall 55 of the peripheral wall 35 respectively.

Shown at numeral 57 in the drawings is one of electric bulb retaining members which is formed of electric conductive metal sheet material. The retaining members 57 includes a plate-like main portion 58 of a size of nearly half of the central portion 51 of the bottom plate portion 34 of the lamp body 33, and retaining pieces 59 and 59' project from the lower end of opposite side edges of the main portion 58. By mounting the main portion 58 on the upper half portion of the central portion 51 of the bottom plate 34 and, thereafter, by slidingly displacing the bulb retaining member 57 downward, the retaining pieces 59 and 59' are received in the retaining grooves 53 and 53' in the side walls 36 and 36' respectively.

A projecting piece 60 is formed to project downward from the central portion of the lower edge of the main portion 58, and has bulb retaining portions 61 and 61 projecting from opposite side edges of the projecting piece 60 in the forward direction.

A contact piece 62 having a base portion 83 projecting forward from one side edge of the upper end portion of the main portion 58, a vertical portion 64 extending upward from the base portion 63 and a contact portion 65 extending from the upper end of the vertical portion 64 to form a chevron like configuration is integrally formed on the main portion 58.

When the main portion 58 is mounted on the upper half Portion of the central portion 51 of the bottom plate 34 the upper end portion of the vertical portion 64 extends through the slit 42 between upper side wall 41 and the side wall 36' and the contact portion 65 is located slightly above the upper edge of the flange 43 and faces the upper surface of the upper wall 41 when the main portion 58 is displaced downward, the opposite ends of the contact portion 65 of the contact piece 62 contact with the upper surface of the upper wall 41 between the flange 43 and the lug 44.

The base portion 63 of the contact piece 62 is bent into a crank shape at the intermediate portion to extend along the inner surface of the side wall 36'.

Another electric bulb retaining member 66 is formed also of an electric conductive metal sheet material, and comprises a main portion 68, bulb retaining portions 67 projecting forward from opposite side edges the main portion 68, a connecting piece 69 extending from the upper edge of the main portion 68 and having a generally L shaped configuration in a side view, and a terminal piece 70 extending from the upper end portion of the connecting piece 69.

The bulb retaining member 66 is mounted on the lamp body 33 by, at first, locating the main portion 68 along the upper end portion of the central portion 51 of the bottom plate 34 with the connecting piece 69 extending along the central portion 51 and the projecting portion 47 and the tip end of the terminal piece 70 being inserted through the inner terminal inserting hole 40 in the bottom wall 39 of the socket recess 38' then, the member 66 is displaced toward the bottom wall 39. Then, the upper portion of the connecting piece 69 is clamped between the projecting portion 47 of the bottom plate 34 and the projection 49, and most of the terminal piece 70 projects into the socket recess 38.

An electric bulb 71 which comprises a filament 72, a glass tube 73 enclosing the filament 72 and metal caps 74 and 74 mounted o opposite ends of the glass tube 73 is provided. The bulb 71 is supported on the bulb retaining members 57 and 66 with the metal caps 74 and 74 engaging with bulb retaining portions 61, 61 and 67, 67 respectively.

Shown at numeral 75 is a switch. The switch 75 comprises a flat box like housing 76, a contact piece 77 exposed on the bottom surface of the housing 76, and a contact piece 78 extending from one of side edges of the bottom surface of the housing 78.

Further, a pressing piece 79 projects from the upper surface of the housing 78 and is urged upward by spring means (not shown), provided in the housing 76. When the pressing piece 79 is pushed into the housing 76 against the spring force, the contact piece 77 is electrically connected to the contact piece 78.

The switch 75 is inserted into a space defined between the upper wall 41, the flange 43 and the lug 44 from the side of the side wall 36', with the contact piece 78 being inserted through the terminal inserting hole 40' provided in the bottom wall 39 of the socket receiving recess 38. When the switch 75 is completely inserted into the aforesaid space, most of the contact piece 78 projects into the socket receiving recess 38, and the contact piece 77 contacts electrically with the contact portion 65 of the contact piece 62 of the bulb retaining member 57. Incidentally, the ridge 46 formed on the lug 44 engages with the rear end of the upper surface of the housing 76, thereby preventing the switch 75 from falling out in the upper direction. The contact portion 65 is, when the switch 75 is inserted into the prescribed space, pressed between the lower surface of the housing 76 and the upper wall 41 of the lamp body 33 thereby biased into a flattened shape which generates resilient force and maintains reliably the electric contact.

Mounting operation of the lamp body 33 on the mirror body 6 is performed as follows:

The upper end of the lamp body 33 is inserted into the upper end portion of the opening 10 in the mirror body 6 such that the front surface of the switch housing 76 engages with the rear side of the upper edge of the opening 10. Thereafter, the lower end of the lamp body 33 is pressed into the opening 10.

In pressing the lower end of the lamp body 33 into the opening 10, the lower edge of the bottom plate portion 34 presses respective inclined surfaces 15a and 15'a of the pawl portions 15 and 15' of the pawls 14 and 14'; thus, the pawls 14 and 14' deflect downward and the lower edge of the bottom plate 34 will ride over the pawl portions 15 and 15'. The pawl portions 15 and 15' cooperate respectively with the retaining openings 56 and 56' in the bottom wall 55; and when the pawls 14 and 14' return to the original condition, the pawl portions 15 and 15' engage respectively with the retaining openings 56 and 56'.

Thus, the lamp body 33 is mounted in the opening 10 in the mirror body 6.

The ridges 13 and 13' formed on the side walls 11 and 11' of the opening 10 engage respectively with grooves 54 and 54' in the rear portion of the side walls 36 and 36' of the lamp body 33, whereby the lamp body 33 is reliably prevented from falling out.

A lens 80 is formed of a transparent synthetic resin material and has a configuration adapted to be snugly mounted in the opening 10 of the mirror body 6.

Projections 81, 81, . . . are formed on the upper and lower end portions of the lens 80, and engaging recesses 82, 82, . . . are formed in the mirror body 6 and adjacent to the upper and lower edge portions of the opening 10. The lens 80 is mounted on the mirror body 6 with the projections 81, 81, . . . engaging respectively with the recesses 82, 82, . . . in the mirror body 6 such that the lens 80 covers the front surface of the lamp body 33.

The cover 84 is formed of a synthetic resin material and has a plate-like configuration adapted to cover the front surfaces of the mirror 29 and the lamp portion 83.

Figure 8:
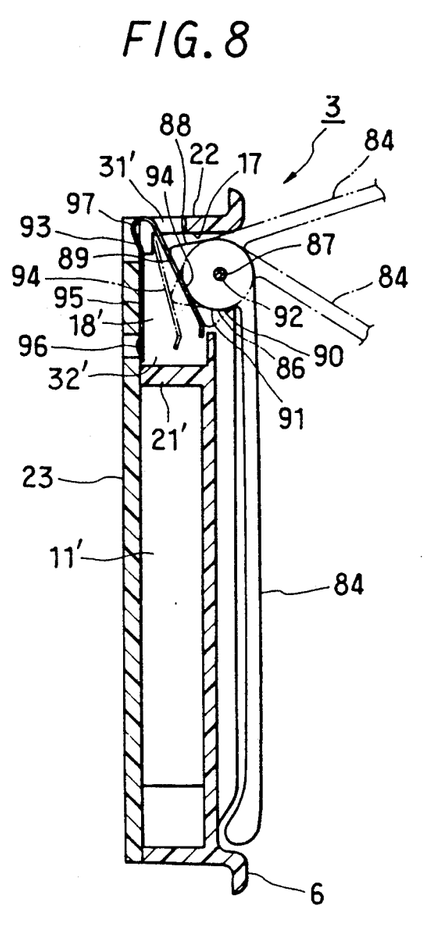
FIG. 8 is an enlarged sectional view taken along line VIII—VIII in FIG. 3.

The cover 84 has a slightly rearward bent upper edge portion 85 and mounting lugs 86 and 86 projecting rearward from the upper end portions of opposite sides of the cover 84. The mounting lugs 86 and 86 have inserting holes 87 and 87 respectively. The outer circumferential surface of the mounting lugs 86 and 86 consist of upper surfaces 88 and 88 in a inclined rear and downward direction from the upper end of the cover 84, rear surfaces 89 and 89 inclined in a front and downward direction from the rear ends of the upper surfaces 88 and 88, lower end surfaces 90 and 90 extending generally in the horizontal direction, and connecting surfaces 91 and 91 connecting the lower ends of the surfaces 89 and 89 with the rear ends of the surfaces 90 and 90 as shown clearly in FIG. 8.

Figure 1:
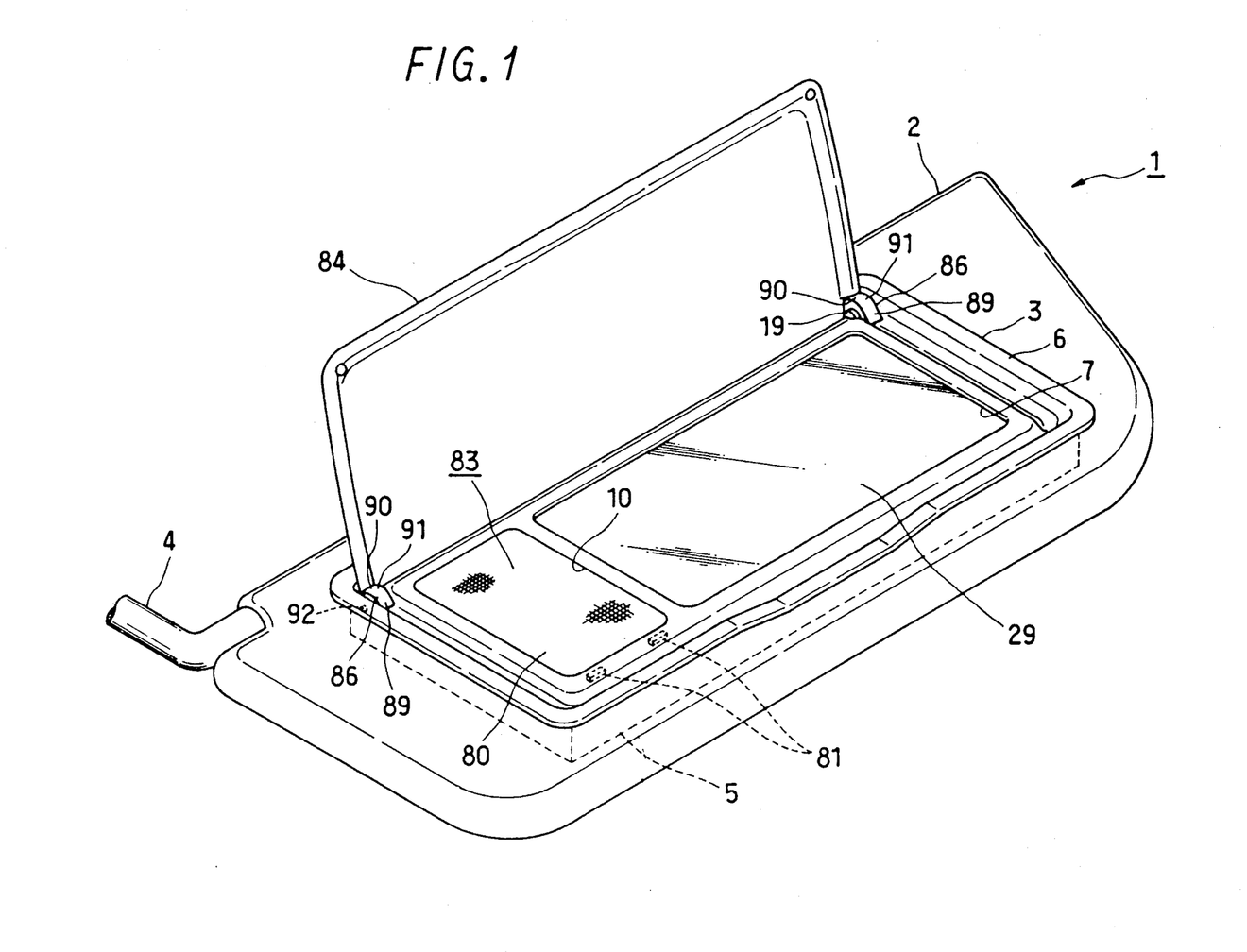
FIG. 1 is a perspective view of a vanity mirror according to the present invention and being mounted on a sun visor of a vehicle.
Figure 2:
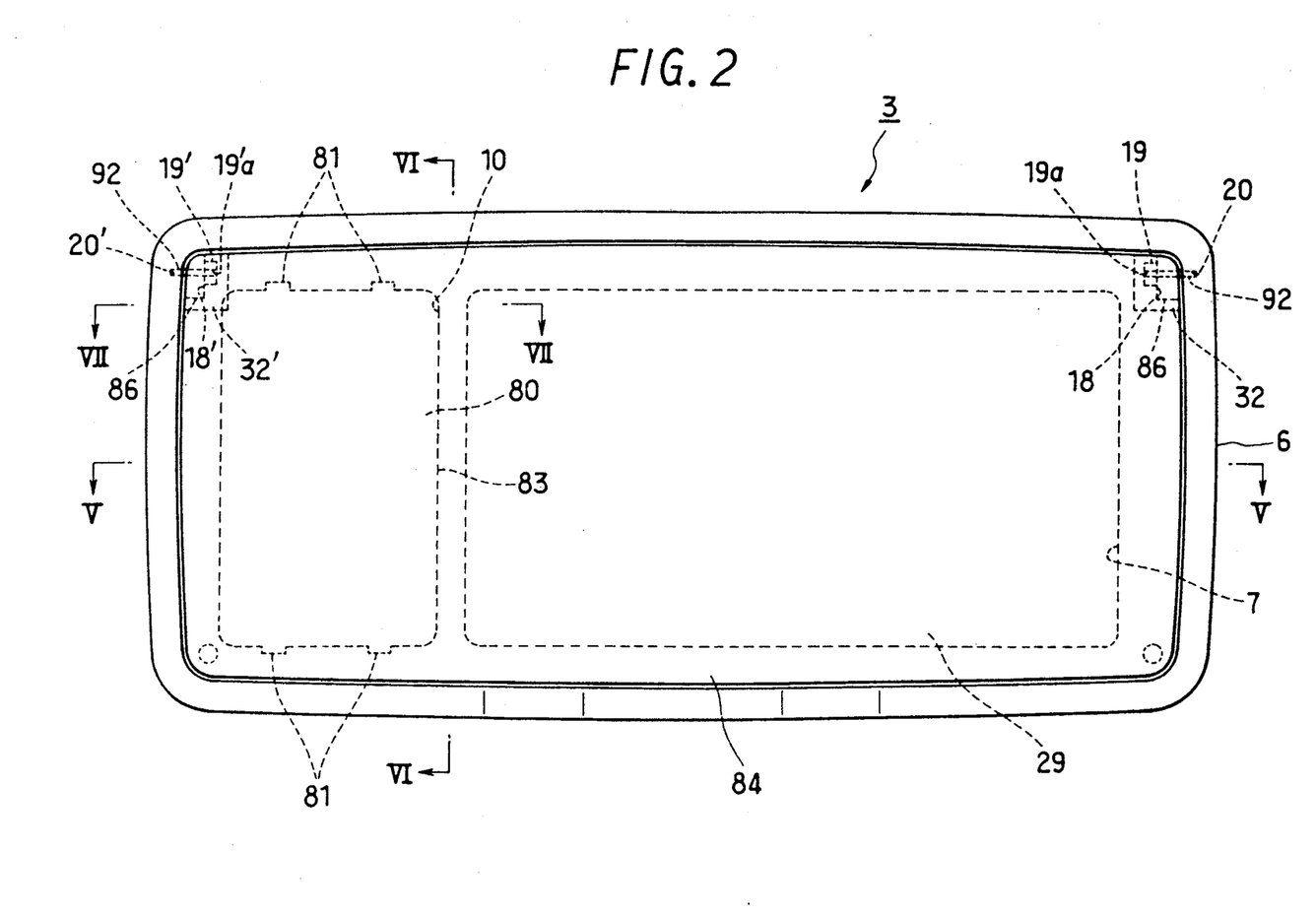
FIG. 2 is a front view of the vanity mirror of FIG. 1 with a cover of which being closed.
Figure 3:
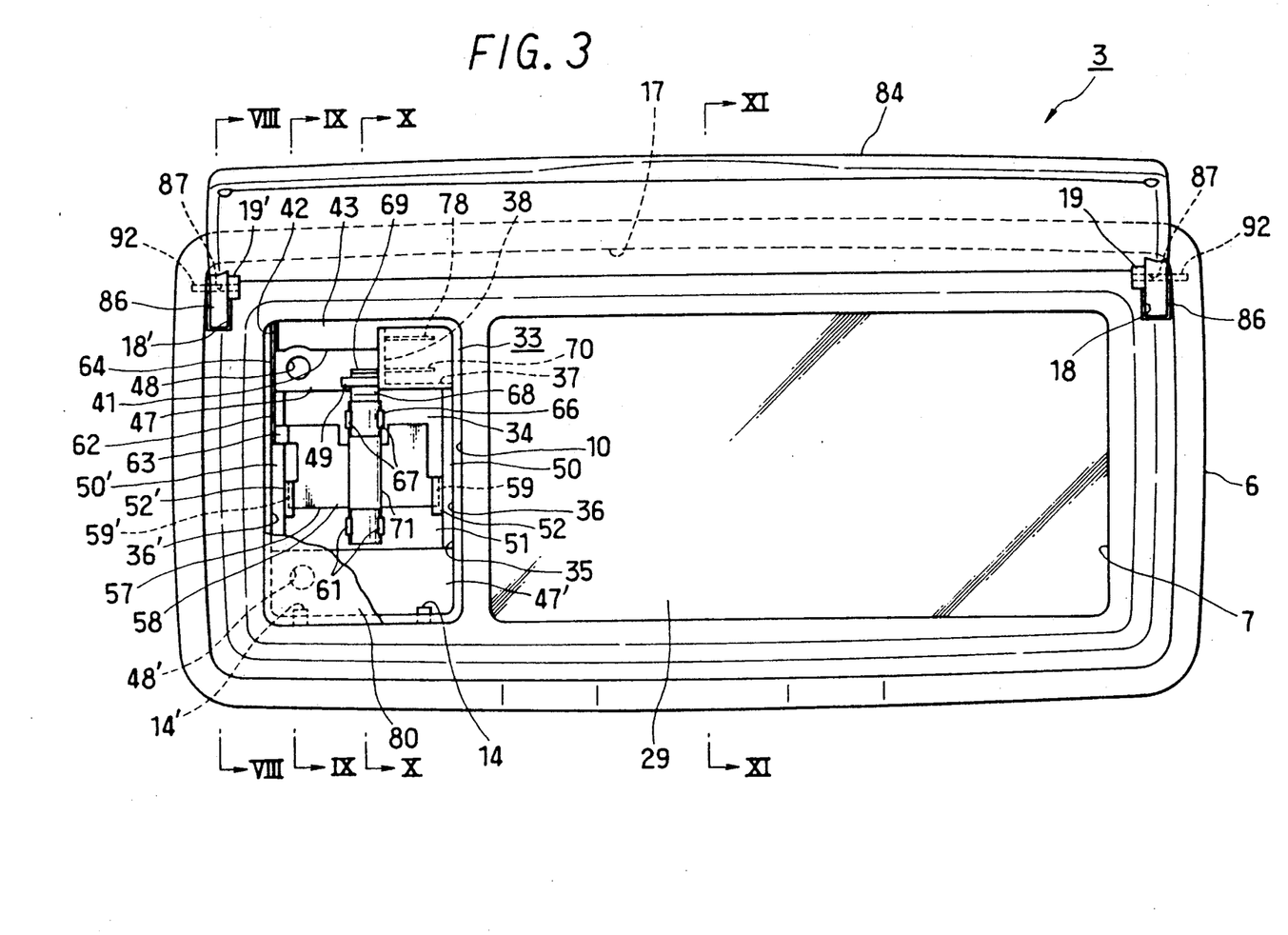
FIG. 3 is a front view of the vanity mirror of FIG. 1 with the cover of which being opened.
Figure 4:
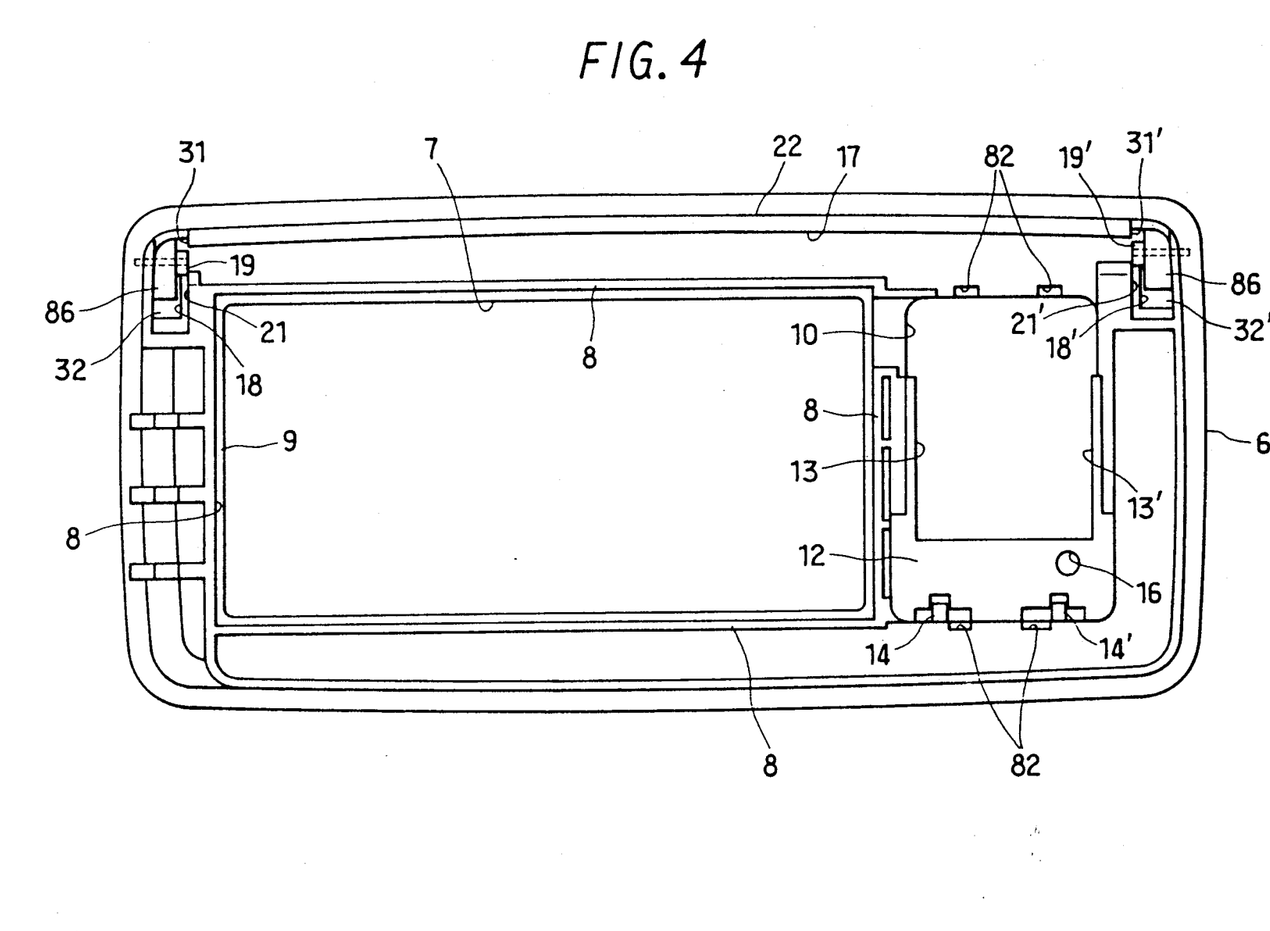
FIG. 4 is a rear view of a mirror body of the vanity mirror of FIG. 1.

When the mounting lugs 86 and 86 of the cover 84 are inserted into the side portions 18 and 18 of the slit 17 in the mirror body 8, the inserting holes 87 and 87 are aligned with supporting holes 19a and 19'a in the mounting lugs 19 and 19' of the mirror body 6 and with the supporting openings 20 and 20' of the mirror body 6, and supporting pins 92 and 92 forcibly inserted through supporting holes 19a and 20, and 19'a and 20' respectively are merely inserted through the inserting holes 87 and 87 respectively, the cover 84 is rotatably supported on the mirror body 6. The cover 84 moves between a close position for covering the front surfaces of the mirror 29 and the lamp portion 83 as shown in FIG. 2 and an open position exposing the front surfaces of the mirror 29 and the lamp portion 83 as shown in FIG. 3.

Shown at numeral 93 and 93 are spring members formed of a sheet spring material covered by a thin thickness (e.g. 0.05-0.10 mm) of synthetic resin layer. The spring members 93 and 93 have a generally V-shaped form in the side view (FIG. 8) and comprise respectively generally straight front pieces 94 and 94 with the lower ends of which being slightly inclined rearward, rear pieces 95 and 95 extending also generally straight and having rearward projecting retaining projections 96 and 96 on the lower ends, and connecting portions 97 and 97 connecting integrally the front and rear pieces.

The spring members 93 and 93 are mounted in the spaces 32 and 32' in the lamp body 6 as follows.

The cover 84 is maintained at the open position, and the lower ends of the front pieces 94 and 94 and the lower ends of the rear pieces 95 and 95 are inserted through the upper openings 31 and 31' of the spaces 32 and 32' with the spring members 93 and 93 being in the compressed condition. In pressing the spring members into the spaces 32 and 32', the front pieces 94 and 94 slide along the upper surfaces 88 of the mounting lugs 86 and 86 of the cover 84 and the rear pieces 95 and 95 slide along the front surface of the rear cover 23. Finally, the retaining projections 96 and 96 on the rear pieces 95 and 95 engage respectively with the retaining openings 28 and 28' in the rear cover 23; thus, the spring members 93 and 93 are prevented from falling out of the mirror body 6.

The spring members 93 and 93 act on the cover 84 such that when the cover is in the open position the front pieces 94 and 94 of the spring members contact with the entire surface of the upper surfaces 88 and 88 of the mounting lugs 86 and 86 thereby maintaining the cover 84 in the open position; and that when the cover is in the closed position, the front pieces 94 and 94 of the spring members contact with the entire surface of the rear surfaces 89 and 89 of the mounting lugs 86 and 86 thereby maintaining the cover 84 in the closed position; and that when the cover 84 is in the position intermediate between the open and closed positions, the front pieces 94 and 94 of the spring members contact with surfaces between the upper surfaces 88 and 88 and the rear surfaces 89 and 89 whereby the spring members 93 and 93 are hardly compressed. Thus, the cover 84 clickingly moves between the open and closed positions.

When the cover 84 is in the open position, the upper edge portion 85 presses the pressing piece 79 of the switch 75 of the lamp portion 83, whereby the contact piece 77 is electrically connected to the pressing piece 79, and electric current is supplied to the bulb 71 through a connector plug not shown in the drawing and the bulb 71 is lit.

As described heretofore, the vanity mirror according to the invention includes a mirror body, a mirror supported on the mirror body, and a cover for exposing and covering the front surface of the mirror, wherein a mounting lug is formed on the cover which is pivotally mounted on the mirror body, the mirror body is formed to define a space for receiving therein pivotally movably the mounting lug of the cover, the mounting lug is formed to have an end surface which faces toward the rear direction in the open condition of the cover and another end surface which faces toward the rear direction in the closed condition of the cover, and a spring member is received in a space in the mirror body and resiliently engages with either one of the end surfaces of the mounting lug selectively.

Thus, the cover is reliably maintained in the open condition by the spring member which abuts with the first mentioned end surface, and is reliably maintained in the close condition by the spring member which abuts with the second mentioned end surface. Further, it is very easy to assemble the spring member into the vanity mirror since the spring member is easily inserted into the space in the mirror body. It is possible to reduce the size of the vanity mirror in the depth direction and also to minimize the size in the width direction since the spring member is disposed on the rear of the cover.

I claim:

1. A vanity mirror for a sun visor of a vehicle of a type including a mirror body, a mirror supported on the mirror body, and a cover being mounted pivotally on the mirror body for uncovering and covering a front surface of the mirror, wherein a mounting lug is formed on the cover, a space receiving therein pivotally the mounting lug of the cover is formed in one end portion of the mirror body, the mounting lug is formed to have an end surface which is faced toward a rear direction in the uncovered condition of the cover and another end surface which is faced toward the rear direction in the covered condition of the cover, and a leaf spring member of a generally inverted V shape in a side view thereof is received in the space in the mirror body for resiliently engaging in face-to-face relationship with either of the end surfaces of the mounting lug, said leaf spring member being mounted on the mirror body by inserting the leaf spring member through an opening formed in the mirror body.

2. A vanity mirror according to claim 1, wherein a projection is formed on one leg of the spring member for engaging with a recess in the mirror body.

3. A vanity mirror according to claim 1, wherein the mirror body and the cover are respectively formed of synthetic resin material.

4. A vanity mirror according to claim 1 wherein the mirror body defines therein a lamp housing.

5. A vanity mirror according to claim 1, wherein the opening in the mirror body for inserting therethrough the leaf spring member is formed in an upper end surface of the mirror body and communicates an interior of the space with an outside of the mirror body.

* * * * *